(12) United States Patent
Golding et al.

(10) Patent No.: US 9,247,077 B2
(45) Date of Patent: Jan. 26, 2016

(54) DOCUMENT HANDLER USING DUAL HEIGHT CALIBRATION TARGET FOR AUTOMATIC CALIBRATION

(71) Applicant: XEROX CORPORATION, Norwalk, CT (US)

(72) Inventors: Paul Simon Golding, Hertford (GB); Michael John Wilsher, Herts (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/086,812

(22) Filed: Nov. 21, 2013

(65) Prior Publication Data

US 2015/0138611 A1    May 21, 2015

(51) Int. Cl.
*H04N 1/04* (2006.01)
*H04N 1/00* (2006.01)

(52) U.S. Cl.
CPC ......... *H04N 1/00087* (2013.01); *H04N 1/0057* (2013.01); *H04N 2201/0003* (2013.01); *H04N 2201/0093* (2013.01)

(58) Field of Classification Search
CPC ................ H04N 1/02815; H04N 1/10; H04N 2201/0422
USPC .................... 358/474, 496, 497, 498, 408, 461
See application file for complete search history.

(56) References Cited

U.S. PATENT DOCUMENTS

| | | | | |
|---|---|---|---|---|
| 5,864,408 A * | 1/1999 | Kumashiro | | 358/461 |
| 6,567,188 B1 * | 5/2003 | Thompson et al. | | 358/461 |
| 7,755,805 B2 * | 7/2010 | Sugeta et al. | | 358/461 |
| 8,786,914 B1 * | 7/2014 | Mui et al. | | 358/474 |
| 2006/0082839 A1 * | 4/2006 | Durbin et al. | | 358/474 |

FOREIGN PATENT DOCUMENTS

JP        2005277581 A    * 10/2005

* cited by examiner

*Primary Examiner* — Cheukfan Lee
(74) *Attorney, Agent, or Firm* — Ronald E. Prass, Jr.; Prass LLP

(57) ABSTRACT

The present application discloses methods and systems for calibrating a scanning system. The scanning system comprises a light-transmissive platen defining a top surface and a bottom surface, a controller, a document handler, and a scanner bar for recording image data from documents at various document heights. In one embodiment, the calibration method proposes the use of two calibration strips in a document scanning system that has both platen scanning and Constant Velocity Transport (CVT) scanning modes. In another embodiment, a scanner is disclosed with a dual calibration target or a single calibration target that is manufactured with two (2) different heights to correct the illumination profile at the CVT scanning height or at the platen scanning height.

20 Claims, 7 Drawing Sheets

DOCUMENT HANDLER USING DUAL HEIGHT CALIBRATION TARGET FOR AUTOMATIC CALIBRATION

BACKGROUND

The disclosure relates generally to a scanning system, and more particularly concerns to calibration of scanners for the scanning of original hard-copy images into electronic form, as would be found, for example, in a digital copier or other scanner.

Document handlers (which are also known as a "constant-velocity transports," or CVTs) are devices that draw individual sheets from a stack of sheets, and sequentially allow the image on each sheet to be recorded, typically by a photoreceptor (in a "lightlens" or analog copier) or by a photosensitive device (in a digital copier, scanner, or facsimile). In a common arrangement, a document handler also has a conventional main platen, on which single sheets can be manually placed, as well as a smaller CVT area, typically adjacent the main platen, which is used by the document handler when sheets are being passed therethrough. In a typical design, when a single sheet is being recorded through the main platen, the photosensitive device with associated light source (or "scan head") is moved relative to the platen to record the entire image; when the document handler is being used to expose images through the smaller CVT area, a photosensitive device is typically left stationary under the smaller CVT area, and the motion of the sheet caused by the document handler provides the necessary relative motion of each sheet past the photosensitive device.

In the practical, day-to-day use of a document handler, the responsivity of the document handler and platen change over time and the changes in the system must be compensated for periodically, in order to ensure consistent output. The periodic compensation of the system for changes in responsivity is known as "calibration" of the scanning device. Common sources of long-term performance variation over time include the declining intensity, primarily due to process variations, of the internal light source. Another performance variation can be attributed to platen and CVT scanning, typically at different heights, due to illumination intensity changes (depth of illumination) at different heights from the light source. A light source targeting platen scanning would require one calibration at the platen height which would be at a different calibration from that required for CVT scanning due to the difference in scan height and the associated depth of illumination change compared to documents at the platen. Current calibration techniques tend to split the difference and balance Image Quality (IQ) between the two scanning modes generating a compromise calibration.

There is, therefore, a need for methods and systems that can optimally control the calibration of a scanner and separately a document handler based upon imaging height, thereby correcting for process variations and other factors that may adversely affect exposure of an image being scanned. This allows the selection of the optimum calibration for a particular system to give the best range and signal characteristics.

SUMMARY

The present application discloses methods and systems for calibrating a scanning system. The scanning system comprises a light-transmissive platen defining a top surface and a bottom surface, a controller, a document handler, and a scanner bar for recording image data from documents at various document heights. In one embodiment, the calibration method proposes the use of two calibration strips in a document scanning system that has both platen scanning and Constant Velocity Transport (CVT) scanning modes. In another embodiment, a scanner is disclosed with a dual calibration target or a single calibration target that is manufactured with two (2) different thicknesses to correct the illumination profile at the CVT scanning height or at the platen scanning height.

DETAILED DESCRIPTION

Figure 1:
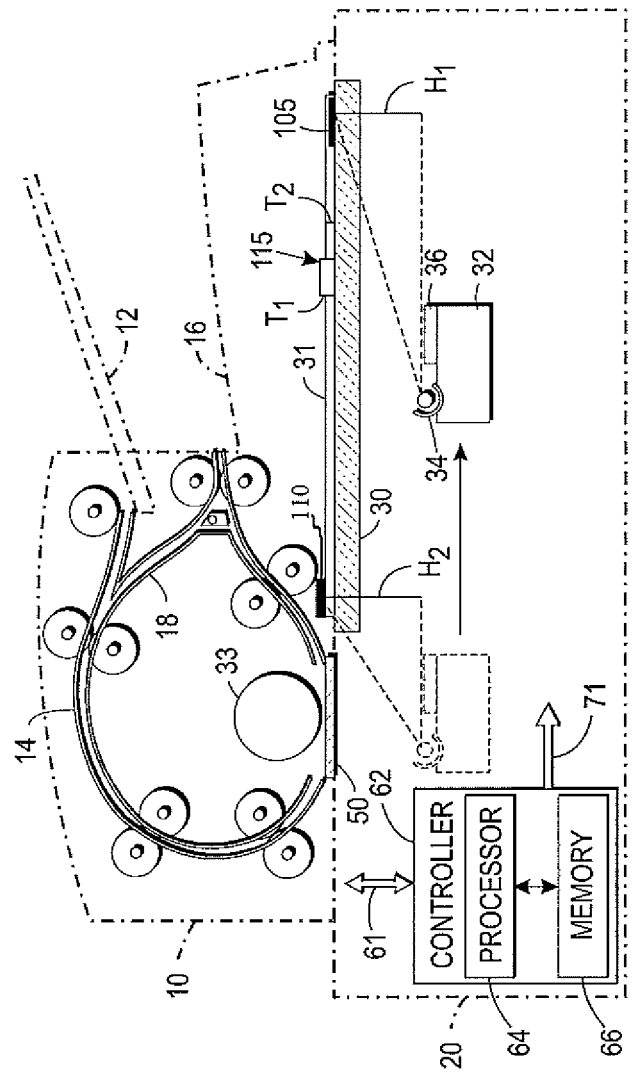
FIG. 1 is an elevational view of a document handler in combination with a scanner or copier in accordance to an embodiment.

According to one aspect, there is provided a method of operating an input scanner, the input scanner including a platen, a document handler, and a scanner bar for recording image data from a sheet on the platen and a sheet passing through the document handler, comprising recording image data from a sheet through the platen, and recording image data from the sheet through the document handler. Aspects of the disclosed embodiments relate to a method to correct illumination defects by a scanning assembly in a recirculation document handler According to another aspect, there is provided a method of operating an input scanner that employs two calibration strips in a document scanning system that has both platen scanning and Constant Velocity Transport (CVT) scanning modes. One calibration strip is located at the platen image height, and the other calibration strip is located at the CVT image height since illumination profile differs between CVT scanning and platen scanning. A dual calibration method optimizes scanning image quality for both the CVT mode and platen mode.

The disclosed embodiments include a method comprising using a scanner with at least a dual calibration target to automatically calibrate said scanner to control an illumination profile for a illumination source to account for differences in imaging heights during document handler scanning and platen scanning; wherein the scanner comprises a light-transmissive platen defining a top surface and a bottom surface, a controller, a document handler, and a scanner bar for recording image data from a document on the light-transmissive platen and a sheet passing through the document handler.

The disclosed embodiments further include an apparatus comprising a scanner with at least a dual calibration target to automatically calibrate said scanner to control an illumination profile for a illumination source to account for differences in imaging heights during document handler scanning and platen scanning; wherein the scanner comprises a light-transmissive platen defining a top surface and a bottom surface, a controller, a document handler, and a scanner bar for recording image data from a document on the light-transmissive platen and a sheet passing through the document handler.

The disclosed embodiments further include a scanner comprising a light-transmissive platen defining a top surface and a bottom surface; a document handler for moving a sheet in a process direction over a scanning window for reading; an optical head including an illumination source and a photosensor assembly for recording image data from a document on the light-transmissive platen or an image-bearing sheet passing through the scanning window; a controller with a processor, in communication with a memory, for executing instructions to: use the scanner with at least a dual calibration target to automatically calibrate said scanner to control an illumination profile for the illumination source to account for differences in imaging heights during document handler scanning and platen scanning; wherein the controller varies calibration values during calibration based upon a reflectance of the dual calibration target.

Embodiments as disclosed herein may also include computer-readable media for carrying or having computer-executable instructions or data structures stored thereon for operating such devices as controllers, sensors, and eletromechanical devices. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Although embodiments of the invention are not limited in this regard, discussions utilizing terms such as, for example, "processing," "computing," "calculating," "determining," "establishing", "analyzing", "checking", or the like, may refer to operation(s) and/or process (es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations. The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

The term "image," as used in this disclosure refers to a graphic or plurality of graphics, compilation of text, a contone or halftone pictorial image, or any combination or subcombination thereof, that is capable of being output on a display device, photoreceptor medium, a marker and the like, including a digital representation of such image.

The term "Document" and an "image-bearing sheet" generally refers to a usually flexible, sometimes curled, physical sheet of paper, plastic, or other suitable physical print media substrate for images, whether precut or web fed.

The term "document handler" as used herein refers to an apparatus that causes a document or image-bearing sheet to be moved past or otherwise exposed to a photosensor array or equivalent scanning hardware for purposes of recording the image thereon. A document handler can comprise several marking engines, scanner, feed mechanism, scanning assembly (scanner bar) as well as other print media processing units, such as paper feeders, finishers, and the like. A "scanner bar" as used herein comprises a photosensor array or equivalent hardware that operates to convert reflected light from a document/image bearing sheet into digital signals. A scanner comprises a scanner bar and associated document handler. As used herein, a multi-function device refers to any device that provides a combination of printing, scanning, and/or copying functions such as for digital copying.

The term "platen scanning" as used herein refers to scanning of documents on the main platen on which sheets can be manually placed.

The term "document handler scanning" as used herein refers to the scanning of image-bearing sheet passing through a scanning window or smaller platen that is typically adjacent the main platen.

The term "calibration target" as used herein will include any reference target which is scanned by a photosensor for purposes of determining an illumination profile for an illumination source including sensitivity, count accuracy, and uniformity and, optionally, for the purpose of setting gain with respect to threshold settings at the photosensor. A calibration target may comprise a first linear white segment and a second linear black segment.

FIG. 1 is an elevational view of a document handler in combination with a scanner or copier. The document handler, generally indicated as 10 (which is also known as a "constant-velocity transport," or CVT), sits atop a main body 20 of the scanner or copier. As is common in office equipment, the document handler 10 is positionable or movable relative to the main body 20, typically by a pivot or hinge-like mechanism (not shown) at the back of the scanner. Further as is common, when the document handler 10 is moved away from the main body 20, a light-transmissive platen (platen) 30 is in effect exposed to the user, so that the user can place a single sheet to have an image thereon recorded. The light-transmissive platen (platen 30) defines a top surface and a bottom surface. When the document handler 10 is in the closed position, a platen backing 31 is in contact with the top surface of platen 30 and faces downward.

Underneath of platen 30, in this embodiment, is what is here called a scanner bar 32. Mounted on scanner bar 32 is a illumination source 34 and a photosensor array 36, which are arranged so that light emitted by illumination source 34 is reflected by an image disposed (document) over platen 30, and the reflected light is recorded by an image receptor, which in this embodiment is a photosensor array 36. Photosensor array 36 typically includes one or more photosensitive chips, and is connected to image processing circuitry downstream (not shown), to record image data in a manner familiar in the art. When a single sheet or other item is desired to be recorded, the scanner bar 32 is caused to move, as shown, relative to the platen 30 to record an entire image on platen 30. In an alternate embodiment of the apparatus, photosensor array 36 is largely stationary within main body 20, but can selectively record an image on scanning window 50 or smaller platen or through document handler 10 by the action of an arrangement of one or more movable mirrors or lenses (not shown).

Figure 2:
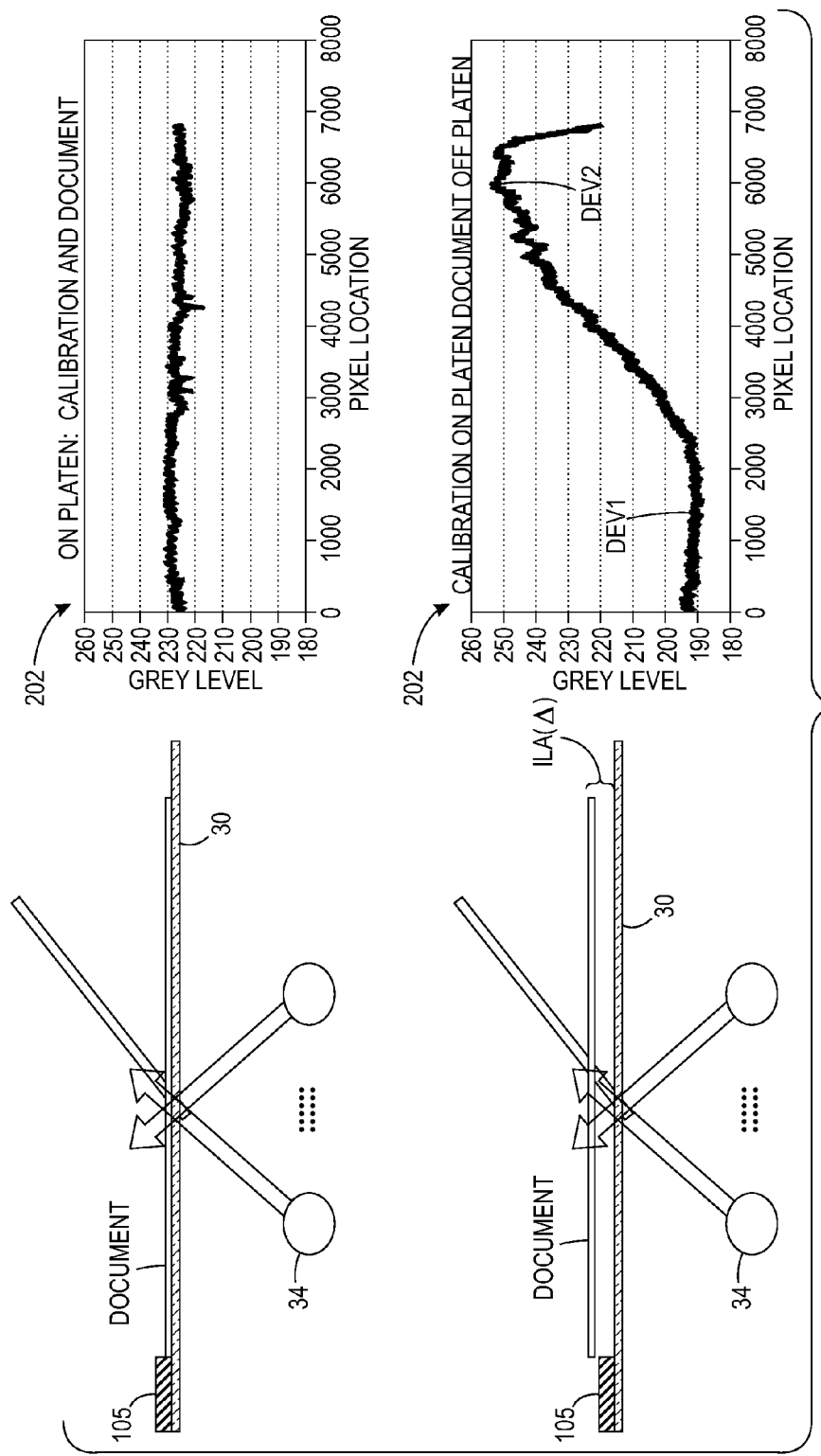
FIG. 2 is an illustration showing the uniformity plot along the sensor when calibrated at the platen and the image profile when a document is scanned off the platen in accordance to an embodiment.
Figure 3:
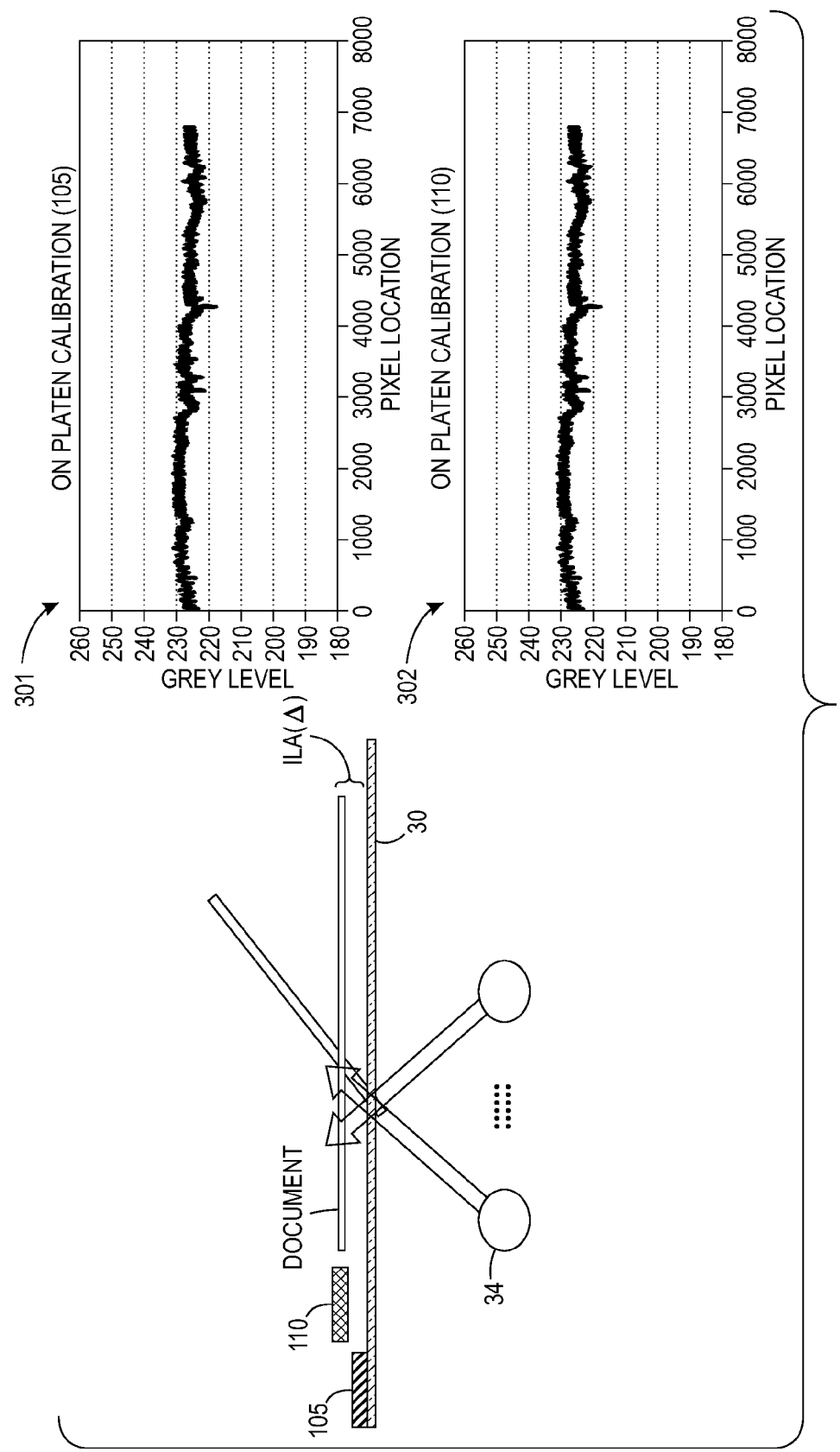
FIG. 3 is an illustration showing the uniformity plot along the sensor when on and off platen calibration is applied and a document is scanned on and off the platen in accordance to an embodiment.
Figure 4:
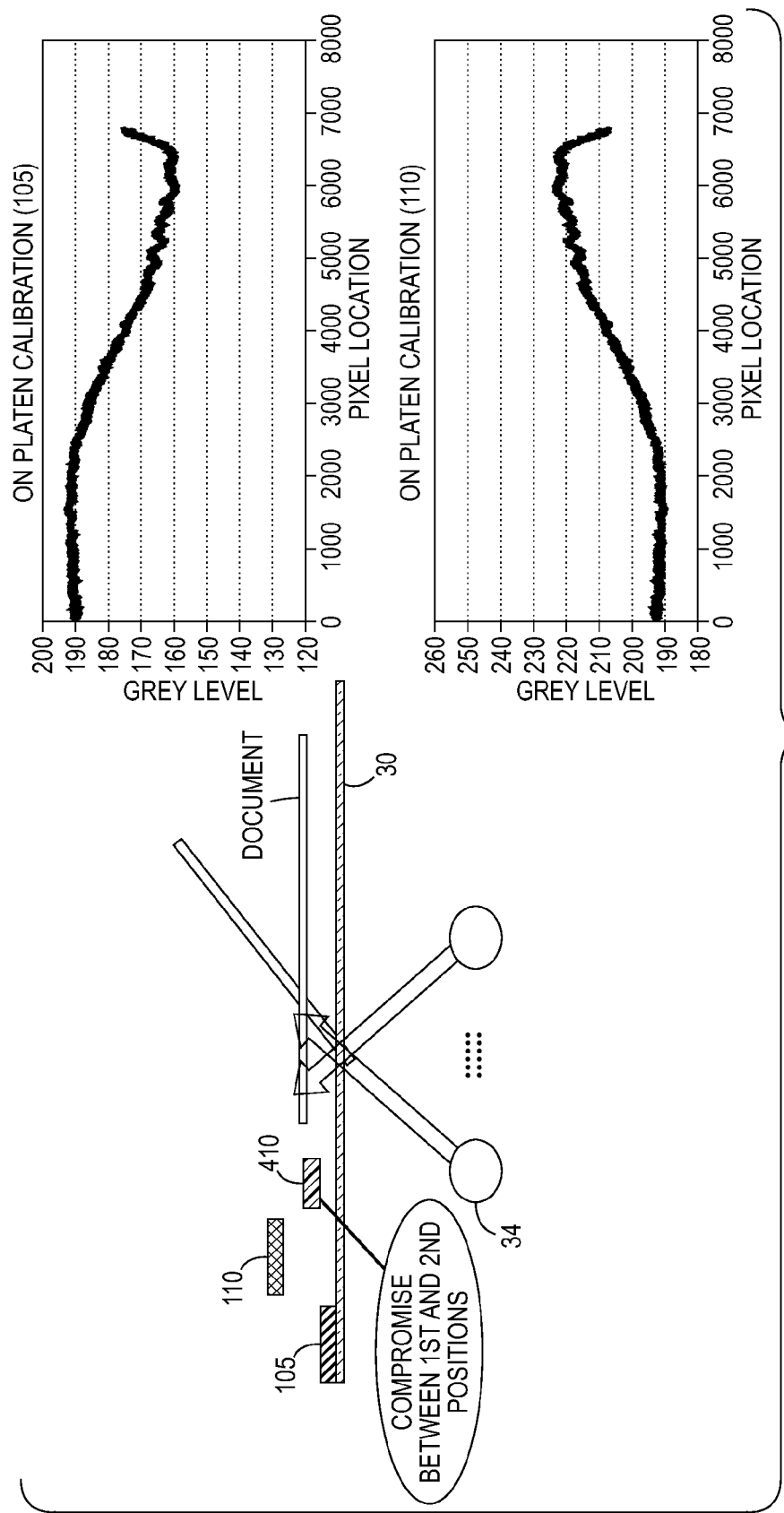
FIG. 4 is an illustration showing the uniformity plot along the sensor where the calibration target is positioned between the two extremes, i.e., on and off platen, and a document is scanned on and off the platen in accordance to an embodiment.

Output analog signals from the photosensor array 36 are conditioned and converted to gray level digital signals, shown in FIGS. 2-4, and sent to controller 62 for further processing or storage. A Processor 64 in controller 62 converts the digital input signals to digital output signals 61 and normalizes and processes a digital image signals as required to enable the document handler/scanner to store and handle the image data in the form required to carry out the scanning task. Processor 64 also provides enhancements and changes to the image signals such as filtering, thresholding, screening, cropping, scaling, and the like. Controller 62 also comprises a computer-readable media, memory 66, for storing instructions/software, machine operating data, and the scanned image data currently being processed. These instructions when compiled cause the controller 62/processor 64 to generate signals 71 to control the scanner bar 32, to store and generate calibration values, and to perform other functions know to those in the art.

When the document handler 10 is used to record images on one or more sheets, the sheets are placed in input tray 12, and are drawn one at a time through path 14 (by one or more motors, not shown, driving the rollers along path 14) past scanner bar 32 and ultimately to an output tray 16. If a document handler 10 is capable of "duplexing," that is, sequentially scanning first one side and then the other side of a sheet, the sheet is effectively inverted and passed through duplexing path 18 for scanning of the second side, in a manner generally familiar in the art. When the document handler 10 is used, scanner bar 32 remains stationary relative to the main body 20, and successive sheets are moved therepast through path 14. As used herein, when the document handler 10 is used to expose a series of sheets to the stationary scanner bar 32, it is said that images are read through the document handler 10, i.e., CVT scanning. When there is no sheet passing through document handler 10, the scanner bar 32 "sees" a backer bar 33 within document handler 10. Backer bar 33 may be in the form of a rotatable roll, as shown, which helps in moving a sheet through document handler 10.

In a practical implementation of a scanner such as shown in FIG. 1, scanner bar 32, along with its illumination source 34, is used for recording both images on a sheet placed on platen 30 and a sheet passing through document handler 10 at the scanning window 50. In this embodiment, there is further provided at least a dual calibration target such as first calibration target 105 and second calibration target 110, which are placed horizontally and vertically apart from each other in locations where they can respectively be read by scanner bar 32 either through platen 30 or through the document handler 10. These calibration targets are positioned at a first height (H1) and second height (H2) to correspond to the differences in imaging heights during document handler scanning and platen scanning. The vertical position is not critical since the effect on imaging is minimal relative to the varying heights (horizontal) of the documents like when doing CVT scanning. Also, these calibration targets may be replaced by a single calibration target 115 that is manufactured with two (2) different thickness (T1 and T2), to account for the difference in imaging heights of documents on the platen 30 versus the document handler at scanning window 50. The calibration is performed at a fixed illumination (light) level with the scanner moved to different heights based on the respective calibration target. Regardless of the number of calibration targets used, it is important to place a target contacting the top surface of the light-transmissive platen and/or contacting a surface at the document handler where it would reasonably correlate to the various document heights.

As is generally known in the art, these calibration targets are areas of predetermined reflectivity which are placed in positions, such as on the platen or near backing surface 31, where they may be read by the scanner bar 32 in a calibration step. These calibration target readings, which may take place from time to time in the operation of the scanner, are respectively used to keep the output of the scanner bar 32 stable over time. This corrects for any drift in the system with time such as a change in brightness of the illumination source 34. The scanner calibration routine ensures that the illumination level and values obtained from the photosensors represent valid and accurate imaging information. In addition, the scanner calibration method also identifies any malfunctioning sensors within the photosensor array, as this would normally cause a failure of calibration. In the current routine, the calibration is performed at a fixed illumination (light) level at different heights based on a calibration target to account for differences in imaging heights during document handler scanning and platen scanning.

FIG. 2 is an illustration showing the uniformity plot along the sensor when calibrated at the platen and a document is scanned on and off the platen in accordance to an embodiment. Illustration 201 shows pixel location and pixel gray scale values (grey level) for calibration on platen with the document scanning at the platen. As can be seen from illustration 201 the upper and lower grey levels stay within the 240 to 220 range, but mostly at the 230 grey level. This is a uniform plot along the sensor when calibrated at the platen. The calibration compensates for any non-uniformity along the pixel direction caused by drift in illumination profile or imaging position, which moves across the illumination profile, but importantly at the calibration target height.

Illustration 202 shows pixel location and pixel gray scale values for calibration at the platen and document then scanned off platen. The difference in document height causes the illumination profile to change by a delta amount, ILA ($\Delta$). The illumination profile shift introduced by the difference in document and calibration target heights, expressed by ILA ($\Delta$), must be considered. For the illumination profile shift, the lamp source has a finite length that causes the normalized illumination profile, i.e., the change in illumination and maximum possible illumination, to change shape when the distance between document plane and calibration plane changes. As can be seen from the illustration the grey scale deviates within a range of 190 to 255 representing a first region of under exposure (DEV1) and second region of over exposure (DEV2). This is an example of when the image is formed at the CVT where the paper typically travels above the glass if the illumination profile is not perfectly uniform as the height of the imaging point changes quite considerable non uniformities can exist as illustrated by a uniformity plot from above the platen (DEV1 and DEV2).

FIG. 3 is an illustration showing the uniformity plot along the sensor with on and off platen calibration and a document is scanned on and off the platen in accordance to an embodiment. Now scans for the platen are calibrated on the first calibration target 105 at the platen height and scans from the CVT are calibrated at the CVT height using second calibration target 110. This substantially calibrates out any non-uniformity at each height giving a uniform image in both cases as shown by illustration 301 and illustration 302. While showing two (2) strips at different heights, a single strip that is manufactured with two (2) different heights, to account for the difference in imaging heights of documents on the platen glass versus the document handler would produce the same illustrations.

FIG. 4 is an illustration showing the uniformity plot along the sensor where the calibration target is positioned between the two extreme, i.e., on and off platen, and a document is scanned on and off the platen in accordance to an embodiment. A compromise situation may also be possible to cover some of the document heights, here the calibration target 410 is positioned between the two extreme positions, as illustrated in FIG. 3. Although you do not perfectly calibrate out any non-uniformity at each height both heights contain a reduced uniformity as shown by the pixel/gray scale plots.

Figure 5:
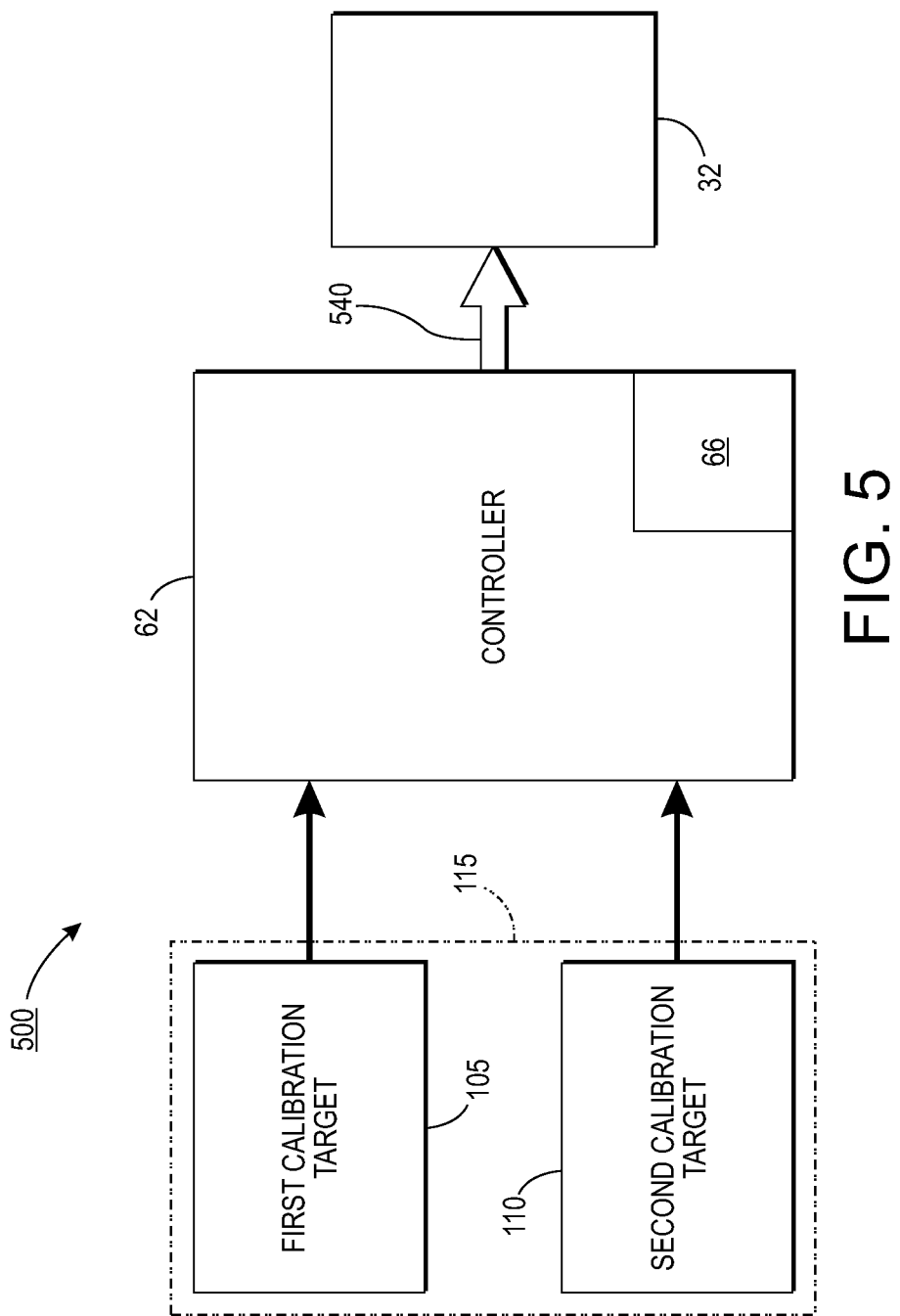
FIG. 5 is a block diagram that illustrates a controller holding two calibrations to correct illumination profile for both CVT scanning height and platen scanning height in accordance to an embodiment.
Figure 6:
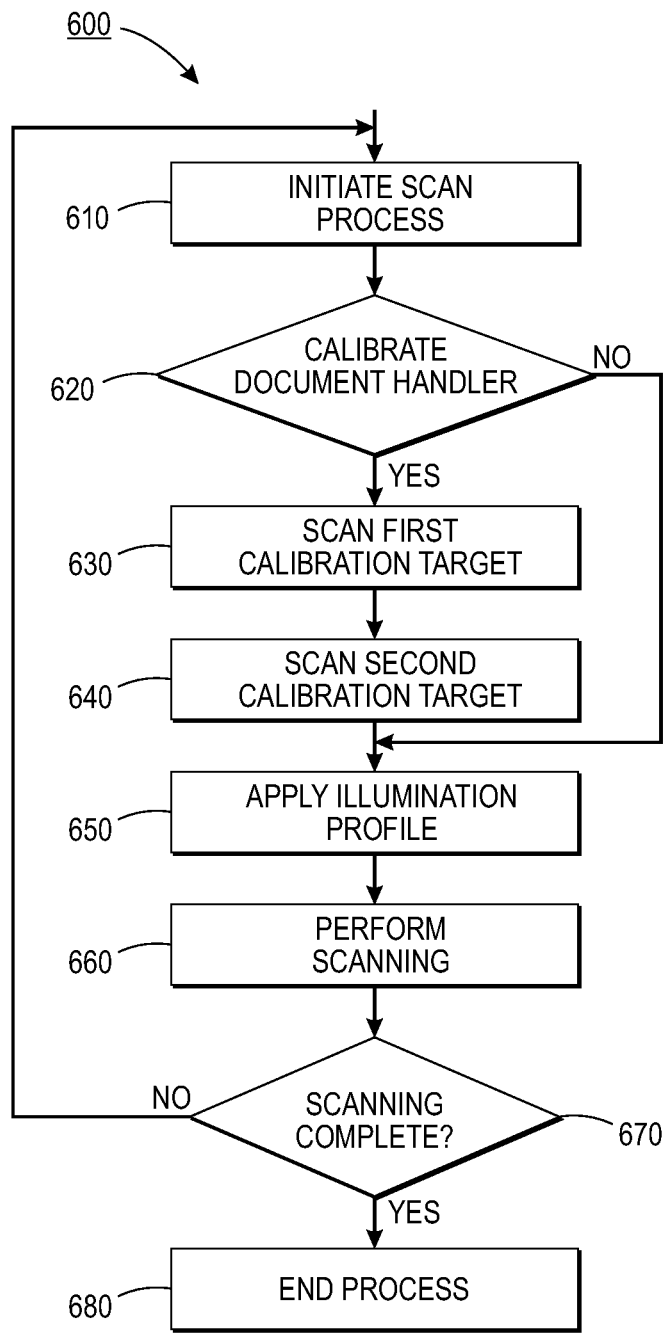
FIG. 6 is a flow chart of a method illustrating the workflow of the calibration process in accordance to an embodiment.

FIG. 5 is a block diagram that illustrates the strategy for calibration at two different heights to correct for illumination profile differences between the two heights for both CVT scanning height and platen scanning accordance to an embodiment. A controller 62 receives the reflectance values from the first calibration target 105, the second calibration target 110, or the third calibration target 115 Controller 62 selects the appropriate stored calibration data to correct the scanned image when performing CVT or platen scanning. The produced calibration values 540 can be used by the scanner bar 32 for the selected scanning process or stored in a computer readable medium like memory 66. FIG. 6 is a flow chart of a method 600 illustrating the workflow of the calibration process in accordance to an embodiment. After attaching the at least dual calibration target to the surface of the scanner glass, the outside surface of the scanner glass, at the platen 30, or in the vicinity or at the scanning window 50 the document handler 10 can be calibrated. If a user desires to scan a document on the scanner, the scanning process is initiated at action 610. The user places the object on the platen or at the input tray 12. Either by selection of the user or instructions in memory 66 at controller 62, a determination 620 is made as to whether the scanner is to be calibrated or not. If the scanner is to be calibrated, the calibration targets are automatically scanned by scanning the first calibration target 630 and scanning the second calibration target 640. Then the controller performs the calibration on the scanner using the calibration target strip and generates calibrated values. The calibration profiles are used by processor 64/controller 62 to generate and later apply to the image accounting for the different imaging height between a sheet laying flat on the platen 30 glass, and that of a sheet moving round a document handler 10. If the user does not want the scanner to be calibrated and there is no scheduled calibration, then action uses a saved illumination profile and actions 630-640 are ignored and the object is scanned using the current calibrated values/illumination profile at action 660. If the user has no more documents to scan at action 670, the process ends at action 680. Otherwise, the process is repeated and control is passed to action 610. If the user or controller desires, the processor can calibrate the scanner for every single scan. The user can decide not to calibrate during a scan if it is more important to the user to perform the scan quickly rather than take the time to calibrate the scanner.

Figure 7:
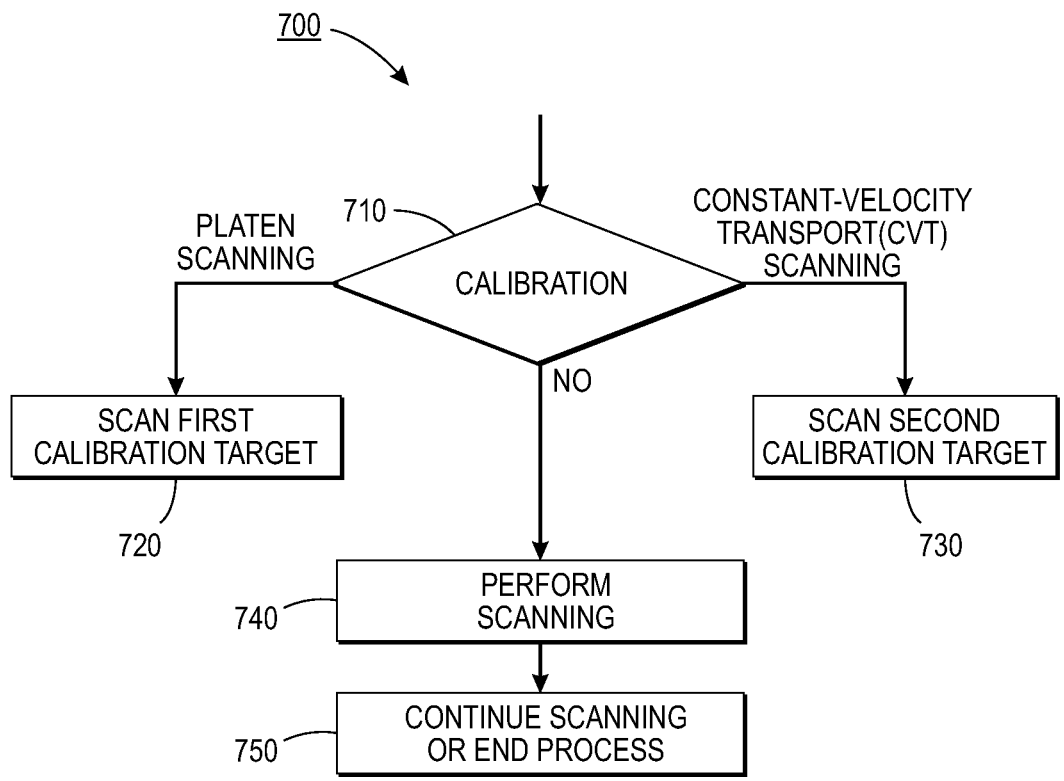
FIG. 7 is a flowchart of a method illustrating the workflow of the calibration at the platen height and at the CVT height to substantially calibrate out any non-uniformity at each height in accordance to an embodiment.

FIG. 7 is a flowchart of a method 700 illustrating the workflow of the calibration at the platen height and at the CVT height to substantially calibrate out any non-uniformity at each height in accordance to an embodiment. In action 710 a determination is made as to the need for calibration for the scanner system. If the determination is "YES" and the user is to engage in CVT scanning then the scanners scans the second calibration target 730. Else if the determination is "YES" and the user is to engage in platen scanning then the scanner scans the first calibration target 720. Otherwise the determination is "NO" and control is passed to action 740 where the saved calibration values and/or the saved illumination profiles are retrieved from a storage device like memory 66 for processing. In action 740, the scanning is performed with the retrieved values. Control is then passed to action 750 to continue the scanning process or terminate the scanning process.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus comprising:
   a scanner with at least a dual calibration target to account for illumination profile differences in imaging heights during document handler scanning and platen scanning;
   wherein a calibration target comprises a first linear white segment and a second black segment;
   wherein the scanner comprises a light-transmissive platen defining a top surface and a bottom surface, a controller, a document handler, and a scanner bar for recording image data from a document on the light-transmissive platen and a sheet passing through the document handler;
   wherein the controller determines an illumination profile for an illumination source prior to scanning a document by scanning the dual calibration target and processing reflectance values from the first linear white segment and the second black segment at the calibration target;
   a processor in the controller for scanning the dual calibration target to automatically calibrate said scanner by:
   determining calibration values from the reflectance values of the dual calibration target;
   providing the calibration values to the scanner bar to use for a selected scanning process.

2. The apparatus of claim 1, wherein the calibration is performed at a fixed light level at different heights based on the at least a dual calibration target.

3. The apparatus of claim 2, wherein calibration values obtained during the calibration is stored in a memory configured to store calibration values for the scanner.

4. The apparatus of claim 1, wherein the at least a dual calibration target is a single calibration target that is manufactured with two different thicknesses to account for the difference in imaging heights of a document on the light-transmissive platen or at the document handler.

5. The apparatus of claim 4, wherein part of one of the two different thicknesses of the single calibration target extends outside of the top surface of the light-transmissive platen.

6. The apparatus of claim 1, wherein the dual calibration target is a first calibration target and a second calibration target placed horizontally and vertically apart from each other where they can be read by the scanner bar.

7. The apparatus of claim 6, wherein the first calibration target defines a first calibration surface contacting the top surface of the light-transmissive platen.

8. The apparatus of claim 6, wherein the second calibration target defines a second calibration surface contacting a surface at the document handler.

9. A scanner comprising:
a light-transmissive platen defining a top surface and a bottom surface;
a document handler for moving a sheet in a process direction over a scanning window for reading;
an optical head including an illumination source and a photosensor assembly for recording image data from a document on the light-transmissive platen or an image-bearing sheet passing through the scanning window; and
a controller with a processor, in communication with a memory, for executing instructions by:
using the scanner with at least a dual calibration target to automatically calibrate said scanner at different imaging heights during document handler scanning and platen scanning;
wherein a calibration target comprises a first linear white segment and a second black segment;
wherein automatically calibrating comprises determining an illumination profile for the illumination source prior to scanning a document from reflectance values of the first linear white segment and the second black segment at the calibration target;
determining calibration values from the reflectance values of the dual calibration target;
providing the calibration values to the scanner bar to use for a selected scanning process;
correcting an output image based upon calibration values obtained during calibration;
wherein the image is adjusted based upon a reflectance of the dual height calibration target.

10. The scanner of claim 9, wherein the dual calibration target is a first calibration target and a second calibration target placed horizontally and vertically apart from each other where they can be read by the photosensor assembly; wherein the first calibration target defines a first calibration surface contacting the top surface of the light-transmissive platen; and wherein the second calibration target defines a second calibration surface contacting a surface at the document handler.

11. The scanner of claim 9, wherein the at least a dual calibration target is a single calibration target that is manufactured with two different heights to account for the difference in imaging heights of a document on the light-transmissive platen or at the document handler.

12. The scanner of claim 11, wherein part of one of the two different thicknesses of the single calibration target extends outside of the top surface of the light-transmissive platen.

13. A method comprising:
using a scanner with at least a dual calibration target to account for illumination profile differences in imaging heights during document handler scanning and platen scanning, wherein a calibration target comprises a first linear white segment and a second black segment;
wherein the scanner comprises a light-transmissive platen defining a top surface and a bottom surface, a controller, a document handler, and a scanner bar for recording image data from a document on the light-transmissive platen and a sheet passing through the document handler;
wherein the controller determines an illumination profile for an illumination source prior to scanning a document by scanning the dual calibration target and processing reflectance values from the first linear white segment and the second black segment at the calibration target;
using the controller to process the reflectance values from the dual calibration target to determine calibration values; and
providing the calibration values to the scanner bar to use for a selected scanning process.

14. The method of claim 13, wherein the calibration is performed at a fixed light level at different heights based on the at least a dual calibration target.

15. The method of claim 13, wherein calibration values obtained during the calibration is stored in a memory configured to store calibration values for the scanner.

16. The method of claim 13, wherein a dual calibration target is a first calibration target and a second calibration target placed horizontally and vertically apart from each other where they can be read by the scanner bar.

17. The method of claim 16, wherein the first calibration target defines a first calibration surface contacting the top surface of the light-transmissive platen.

18. The method of claim 16, wherein the second calibration target defines a second calibration surface contacting a surface at the document handler.

19. The method of claim 13, wherein the at least a dual calibration target is a single calibration target that is manufactured with two different heights to account for the difference in imaging heights of a document on the light-transmissive platen or at the document handler.

20. The method of claim 19, wherein part of one of the two different heights of the single calibration target extends outside of the top surface of the light-transmissive platen.

* * * * *